US008825683B2

(12) United States Patent
White et al.

(10) Patent No.: US 8,825,683 B2
(45) Date of Patent: Sep. 2, 2014

(54) GENERATING GEOGRAPHICAL KEYWORDS FOR GEOTARGETING SEARCH ENGINE-OFFERED ADVERTISEMENTS

(75) Inventors: Ian White, San Francisco, CA (US); Tim Caro-Bruce, San Francisco, CA (US); Riyaz Fazal, Berkeley, CA (US); Nino Walker, San Francisco, CA (US)

(73) Assignee: Urban Mapping, Inc., San Francisco, CA (US)

( * ) Notice: Subject to any disclaimer, the term of this patent is extended or adjusted under 35 U.S.C. 154(b) by 1109 days.

(21) Appl. No.: 12/275,387

(22) Filed: Nov. 21, 2008

(65) Prior Publication Data

US 2009/0138445 A1    May 28, 2009

Related U.S. Application Data

(60) Provisional application No. 60/990,103, filed on Nov. 26, 2007.

(51) Int. Cl.
*G06F 17/30* (2006.01)
*G06Q 30/02* (2012.01)

(52) U.S. Cl.
CPC ..................... *G06Q 30/02* (2013.01)
USPC ....................................... 707/758

(58) Field of Classification Search
None
See application file for complete search history.

(56) References Cited

U.S. PATENT DOCUMENTS

| | | | | |
|---|---|---|---|---|
| 5,731,978 | A | * | 3/1998 | Tamai et al. .................. 701/201 |
| 2003/0208578 | A1 | * | 11/2003 | Taraborelli et al. ........... 709/223 |
| 2005/0050027 | A1 | | 3/2005 | Yeh et al. |
| 2005/0065959 | A1 | | 3/2005 | Smith et al. |
| 2008/0040329 | A1 | * | 2/2008 | Cussen et al. .................. 707/3 |
| 2009/0005968 | A1 | * | 1/2009 | Vengroff et al. ............. 701/202 |

FOREIGN PATENT DOCUMENTS

| KR | 20000050201 A | 8/2000 |
|---|---|---|
| KR | 20020020869 A | 3/2002 |
| KR | 20080035089 A | 4/2008 |

OTHER PUBLICATIONS

Daniel Egnor, Google Programming Contest Submission: Geo Search, Apr. 30, 2002.*
PCT International Search Report, International application No. PCT/US2008/084333, mailed Apr. 16, 2009.

* cited by examiner

*Primary Examiner* — Syed Hasan
(74) *Attorney, Agent, or Firm* — Marsh Fischmann & Breyfogle LLP; Kent A. Lembke (57) ABSTRACT

A computer-based method for use in geotargeting online ads to users of search engines by allowing comparison of user's search terms with a set of geo-keywords. The method includes providing a geographic keyword generator on a server that is linked to the Internet. The method includes providing a spatial database storing classes of geographic keywords. The method continues with receiving a keyword request including a business address from a client node. The keyword generator determines a service area based on this location, and a set of geographic keywords is retrieved from the spatial database that are associated (e.g., within) the determined service area. This set of keywords is transmitted or reported to the client node (e.g., displayed in a web browser or user interface) for use in geotargeting of their online advertisements. The keyword request includes a business type, and the service area is sized based on the business type.

20 Claims, 6 Drawing Sheets

GENERATING GEOGRAPHICAL KEYWORDS FOR GEOTARGETING SEARCH ENGINE-OFFERED ADVERTISEMENTS

CROSS-REFERENCE TO RELATED APPLICATIONS

This application claims the benefit of U.S. Provisional Application No. 60/990,103 filed Nov. 26, 2007, which is incorporated herein by reference in its entirety.

BACKGROUND OF THE INVENTION

1. Field of the Invention

The present invention relates, in general, to use of search engines to search online content and return search results along with advertising targeted to the searching party, and, more particularly, to computer-based methods for providing advertising based on geographical information to provide an alternative to existing Internet Protocol (IP) or user input-based geotargeting of online, Internet, or web advertising content.

2. Relevant Background

Search engine marketing (SEM) is a form of Internet marketing that seeks to promote websites and advertising content by increasing visibility in search engine result pages (SERPs). SEM has grown increasingly important as the number of Internet users has rapidly increased, with many customers turning to the Internet as their primary source for finding service providers (e.g., to find a good restaurant, to find a doctor, to locate a hotel, and so on). In a SERP, the search engine provider typically will present a listing of websites ranked in the order of relevance to a set of search terms, with relevance being determined by the search engine's algorithms. Search engine providers have built a business model to finance their services that includes providing pay per click programs and paid search opportunities, and, as a result, most SERPs now include paid advertisements at the top of the page and along one or both sides (as well as pop up advertisements in some cases).

SEM methods are rapidly being developed to facilitate service providers to better utilize the Internet and business models of search engine providers. SEM methods may include search engine optimization (SEO) and paid placement/inclusion. SEO is the process of modifying the structure and content of a website such that search engines can readily understand and find the website during a search of website content databases. For example, SEO may include choosing keyword phrases (such as phrases that are 2 to 4 words long) and repeating these throughout the content of the page and other locations (such as in the title, meta tags, headlines, text links, and so on). Use of keyword phrases often helps to target particular searchers (e.g., customers). SEO is used to enhance a search engine ranking of websites, and the ranking is intended to indicate which websites have content that is more highly relevant relative to other websites based on search terms entered by a search engine user in the search engine's query or search box. Search engine rankings are important because the websites returned in a SERP are provided in the ranked order with the most relevant or highest ranked sites listed first, and most Internet searchers only visit the most highly ranked sites.

SEM methods also include determining how best to spend money on pay per click or paid inclusion advertising provided by search engine providers. Participating in an advertisement offering by a search engine provider can be expensive. Some service providers pay relatively large amounts to appear or be presented on numerous SERPs because they bid large amounts during keyword bidding offered by the search engine provider (e.g., a dollar amount that an advertiser is willing to pay to display an ad relative to the competition). For example, a search engine provider may determine which websites or website advertisements to present in a SERP by using the query or search terms and comparing these to keywords provided or purchased by the advertisers. Typically, the more general the keyword (i.e., the more likely it is used in a search) the higher the cost in a keyword bid. However, this may result in a site getting many visitors and generating a higher advertising cost without attracting the kind of visitors that result in sales due to poor targeting of the ads to the viewers/customers. Numerous visitors may be desirable for a general, national brand advertising campaign (such as beverage or automobile advertising campaign), but it is not typically acceptable with many advertisers carefully tracking conversion of traffic to queries/sales. Since advertising spending is limited for most service providers, advertisers are continually searching for ways to better target their ads and have them returned on SERPs with a higher likelihood of conversion to a sale.

In some cases, the search engine may utilize a management system that controls selection and placement of sponsored links or web advertising based on other information than a keyword search such as geographical location. For example, the advertisement management system may use geotargeting, which generally has involved the determining of the geolocation or physical location of a website visitor or individual presenting a query to a search engine. When a search engine used geotargeting for its advertising selection and/or ranking, the location of the searcher or user is utilized to select which advertisements or advertising content should be presented on the SERP rather than simply keyword searching on phrases or terms provided by the advertiser (e.g., keywords bid on by the advertisers typically related to their goods or services). For example, a search engine provider may use geotargeting to try to present pay per click advertisements only to users who live in locations selected by the advertiser, e.g., only display an ad for a California sports team when the searcher is located in California or the like.

Unfortunately, geotargeting is, often not effective in accurately targeting customers via search engine result pages (SERPs), especially in targeting customers of businesses or service providers with a relatively small or localized service area. Geotargeting of advertising may be provided by geo-intelligence embedded or running on the serving platform or by processing a user profile or a user-provided search with geographic terms. When carried out by an ad serving platform, geotargeting is generally limited to its embedded geo-intelligence, and most geotargeting algorithms determine a searcher's location based on an Internet Protocol (IP) address. IP-based geomarketing seeks to convert a computer's IP address into a real world location. In theory, such a location technique seems effective and valuable, with the ad server assuming the user is located in a geographic location associated with the IP address of the submitted query or search request to the search engine. In practice, the use of IP addresses to identify actual location provides a rough estimate such as within a state or region, but not the actual location of the user. IP geomarketing involves first using an automated discovery of the user's geolocation information based on IP addresses based on traceroute, pings, and a combination of other advanced tools. It is dependent upon a pre-analysis of the entire IP address space, which is a huge task as there are more than 4 billion possible IP addresses and IP addresses are constantly being assigned, allocated, reallocated, moved, and changed due to routers being moved, enterprises being assigned IP addresses, networks being built/changed, and use of load balancing equipment and proxy servers by Internet service providers to distribute traffic across their network(s). As a result, the locations determined based on IP addresses may only be accurate on a regional level or on city-based level. In other cases, the use of IP addresses simply results in bad location information, such as resulted in past experiences where an Internet service provider indicated all of their nationwide subscribers had IP addresses in a single city (e.g., use of load balancers and proxy servers made all packets appear that they came from a location other than the user's/searcher's actual location). In either case, IP geotargeting does not provide the accuracy or reliability that is needed to provide effective targeting of advertising based on geographic location. Additionally, the location that is being determined is the location of the user, but the query or search input by the user often is for a differing location, such as when planning a vacation or trip, a dinner in another city, and so on.

In addition to a website or search engine determining a user's location based on IP address lookup, users may directly provide information about their location. For example, user's may provide a user profile to a website or to a search engine as part of establishing an account. Because user profiles are predetermined, they require no additional effort from the user when they perform an online search. However, when a user or searcher is searching outside the area or location contained in their user profile, the advertising provided with their search results will typically be inappropriate (e.g., advertise restaurants in New York City based on the user profile when the searcher is planning a trip to Los Angeles). The majority of the time searchers are searching outside their profile-defined geographic area. In these cases, the burden is placed on the searcher to define the geographic proximity of their search, and this creates another set of problems for the ad management tools of search engines (and website providers). Formal geographical terms such as cities, addresses, postal codes, and so on may be properly recognized by a search engine, but searchers often will not know this information or incorrectly enter it as part of their searches. In other cases, informal geographical terms such as schools, parks, neighborhoods, key landmarks, and so on are only recognized in keyword searching methods and are not related spatially or associated to a particular geographic location or area. For example, a search attempting to find a coffee shop in the Tribeca neighborhood of Manhattan may return results and/or advertising for the Tribeca Coffee Shop in Krakow, Poland or in Durban, South Africa while failing to target advertisements for this neighborhood toward the searcher.

Hence, while IP-based geotargeting can be effective at a national, state, and, sometimes, city level, this form of geomarketing fails to provide the granularity required to support truly local ad targeting. User profile-based geotargeting is useful if the searcher is limiting their queries to locations and service providers within their profile-defined location or area, but this form of geomarketing fails once the user begins searching other geographic areas and also often fails to provide a desired reliability (e.g., because it relies on a user to define their geographic location in their profile) and/or granularity (e.g., may only identify a city or state location). There is an ongoing need for improved methods and systems for targeting online advertisement toward users of the Internet (e.g., to users of search engines that return advertisements selected based on the geographical information or users that search while visiting another website that may return results along with advertisements).

SUMMARY OF THE INVENTION

Briefly, geotargeting methods provided in accordance with the present invention provide enhanced, online advertising that can be effectively targeted to local or regional service providers. For example, a restaurant with a single location may target online searchers that search for dining options through a search engine and have their online ad or website link presented to individuals that enter search terms or keywords that match geographic keywords or geomodifiers (geomods) defined for that restaurant's service area (e.g., for a 30 mile radius from the restaurant's physical/geographic location, for a service area defined by a 45 minute maximum drive time, and/or for a service area defined by system or user-provided parameters (such as within a state or country)). Traditional IP-based geographic targeting focuses on the geographic origin of the search query, which may be inaccurately determined, and not on the user's or searcher's intent for their search or online query. For example, a searcher may be searching from their home in Dallas, Tex. but looking for a hotel in San Diego, Calif., and IP-based geotargeting methods may result in the searcher viewing ads for hotels and related services near Dallas and not San Diego. Further, while IP-based geotargeting may be effective on a national or state level, it typically fails to provide desired granularity or specificity required to support effective local advertising (e.g., a shopper in North Hollywood may not be interested in a shop in a neighborhood of Anaheim while both are considered in Los Angeles by some IP-based geotargeting methods).

The geomodifier or geo-keyword generator method is provided by a software-based tool (e.g., a web service, application programming interface (API), or the like that may be labeled "GeoMods" or similar names herein) that may be accessed by online advertising services or by others trying to target Internet users or online searchers for particular service areas or defined service areas. GeoMods is a tool that receives or, more typically, determines/generates a definition of a service area for an online advertiser. In the typical case, it receives a business address or geographic location and other service area defining data, such as business type, business size, maximum drive time, transportation mode(s), geographical features, locality type (e.g., urban, suburban, rural, or the like) as input and generates a service area based on this input. The geomodifier engine or GeoMods then generates a set of keywords based on the defined or received service area that defines or relates to the advertiser's service area. The geomodifier engine returns or outputs geographic keywords or geo-keywords such as names of neighborhoods that overlap the service area, area codes within the service area, parks nearby the business, landmarks in the service area, and other geographic or spatial attributes that better textually define the service area for a business (e.g., search terms that are often used by online searchers when trying to define a locality that is associated with the advertiser's service area). The geomodifier engine or API may be provided as a programmatic application or as an interactive application. Keywords are typically returned to the requesting party (e.g., an advertising platform or system) in plain text, making integration into campaign management platforms relatively easy.

The keywords returned may take many forms to act to define a service area. In some cases, the keywords may be thought of as falling in one of the following classes (e.g., providing a word or phrase defining one of the following classes): neighborhoods, area codes, parks, rail systems/stations, postal codes, landmarks, hospitals, mass transit systems/stations, administrative boundaries, museums, airports, schools/universities, political/governmental boundaries (e.g., city boundaries, county boundaries, state boundaries, country boundaries, and the like), geographic features, bus stations, cultural attractions, countries, post offices, and the like. For example, an advertiser may provide service area defining data as input to the geomodifier generator engine that includes an address or location of a business (e.g., 74 New Montgomery, San Francisco, California) along with information useful for defining a business type (e.g., a coffee shop). The geomodifier generator engine may use the business type to retrieve a default service area size (e.g., a few blocks up to 1 mile or more in radius or the like), and the engine may generate a service area definition by creating a circular area about the center point/location at the business address. A spatial database containing geographically-based data (e.g., data/keywords for the classes listed above) is searched or accessed with the service area definition to generate a listing of or set of geo-keywords for the service area. In the above example, the keyword set returned may include SoMa (e.g., a matching neighborhood), San Francisco Museum of Modern Art (e.g., a matching museum or landmark), Transbay Terminal (e.g., a matching mass transit system/station), and the like.

Advertisers use these keywords in their SEO and keyword advertising efforts to target local customers and/or potential customers intending to visit their service area. For example, the advertisers may update metadata of their website to attempt to be more highly ranked in the SERP, e.g., to be shown more often and higher in the results portion of a search engine results page or SERP. The advertiser may also be more highly ranked in paid advertising or pay per click portions of the SERP, with search engine provider or ad server, for example, applying search terms entered by an online searcher to find matches in the geo-keywords of the advertiser (when separate content/phrases are provided or paid for (e.g., keyword bidding or the like) or in their page/site content or the like) to more accurately select advertisers based on geographical information provided by the searcher. By incorporating some or all of the keywords returned from the geomodifiers generating engine into SEO optimization strategies or using them in search advertising, the advertisers (e.g., the coffee shop's) website will likely get traffic that is more local in nature, and the site gets better qualified visitors without having to focus on more competitive and higher priced keywords (e.g., bid higher for keywords to obtain more traffic that may be less relevant/qualified). More particularly, a computer-based method is provided for use in geotargeting online ads to users of search engines by allowing comparison of user's search terms (e.g., their intent for locality) with a set of geo-keywords or geomods associated with an advertiser's website or ads. The method includes providing a geographic keyword generator or web service running on a computer or server that is communicatively linked to a digital communications network (e.g., the Internet or the like). The method also includes providing a spatial database in data storage that is accessible by the keyword generator, and the database stores a plurality of geographic keywords. For example, the keywords may be associated with spatial data useful for defining an advertiser's service area, e.g., names or terms associated with one or more of classes such as neighborhoods, area codes, parks, rail systems, postal codes, landmarks, hospitals, mass transit systems, administrative boundaries, museums, airports, schools, governmental boundaries, geographic features, bus stations, train stations, cultural attractions, and post offices. The method continues with receiving a keyword request including location data for an advertiser (e.g., a business address or the like) from a client node, such as an advertising platform. The keyword generator is used to determine a service area based on this location data, and then a set of geographic keywords is retrieved from the spatial database that are associated with (e.g., within) the determined service area. This set of keywords is transmitted or reported to the client node (e.g., displayed in the user's GUI or the like) for use in geotargeting of their online advertisements.

In practice, the keyword request may include a business type, and the determining of the service area may involve selecting a size of the determined service area based on the business type (e.g., larger for a service that provides higher priced goods/services and smaller for a service that provides lower priced/commodity-type goods or the like). The service area determination may also include determining whether the location data falls within an urban (higher population density) locality or within a non-urban (lower population density) locality and then sizing the service area based on this added information (e.g., smaller within an urban setting and larger in a suburban or rural setting). The keyword request may also include a maximum travel time, and the determination of the service area may include selecting a size of the area to suit this travel time limit. For example, the determination may include modeling the travel time or travel cost to create a number of polygonal areas extending outward from the advertiser's location. Then, the service area may be generated by combining these polygonal areas. In other areas, the location data may be used as a center point of a circular area and a radial distance is chosen (e.g., based on the business type provided in the request or based on the population density of the center point) and a circular service area created. The keyword request may also include additional area size/shape restrictions (e.g., provide service only within a particular city or state boundary), and the determination may include applying these additional restrictions/limitations to the originally created or base service area. The method may also include operating the client node to create or modify a website definition or an online advertising search term listing to include all or a subset of the returned geographic keywords, whereby the service area of the advertiser is defined with spatial data, keywords, and/or phrases (such as neighborhood names, landmarks, mass transit names/identifiers, and so on) to allow ready comparison with online searchers' entered query terms/phrases.

DETAILED DESCRIPTION OF THE PREFERRED EMBODIMENTS

The present invention is directed to computer-based methods and systems for generating sets of geographic (or geo) keywords based on a service area. The service area may be defined using methods/algorithms of the invention or be received as part of a geo-keyword request (e.g., from an advertising platform or other party/system). In some cases, a geomods or geo-keyword generator engine or web service (e.g., an API that utilizes standard web protocols) is provided that serves spatial terms that are relevant to a specified area or to a business service area determined by the generator engine based on service area data (e.g., a business location(s) and other parameters such as maximum drive/travel time). The generator engine leverages a data store with spatial data with spatial-based or geo keywords stored, in some cases, in a database with records searchable with a definition of a geographic area (e.g., definition of a business service area). The geo-keywords may include many of the same geo-keywords that are used to power local search portals. In some cases, queries to define a service area with keywords may be made (in addition to with service area definition or in place of such definition) by extent, point radius, address, and/or by naming additional geo-keywords as constraints. Organizations may leverage the geospatial capabilities provided by the spatial database or data store without having to develop these capabilities internally, quickly deploying enhanced geotargeting capabilities.

The functions and features of the invention are described as being performed, in some cases, by "modules" or "engines" or "APIs" that may be implemented as software running on a computing device and/or hardware. For example, the geotargeting method, processes, and/or functions described herein and including service area determination, geo-keywords generation, reporting/outputting such keyword listings, and geotargeting using such keywords may be performed by one or more processors or CPUs running software modules or programs. The methods or processes performed by each module are described in detail below typically with reference to functional block diagrams, flow charts, and/or data/system flow diagrams that highlight the steps that may be performed by subroutines or algorithms when a computer or computing device runs code or programs to implement the functionality of embodiments of the invention. Further, to practice the invention, the computer, network, and data storage devices and systems may be any devices useful for providing the described functions, including well-known data processing and storage and communication devices and systems such as computer devices or nodes typically used in computer systems or networks with processing, memory, and input/output components, and server devices (e.g., web servers used to serve or host search engines, ad servers, and databases or other data stores with classes of spatial data, and the like) configured to generate and transmit digital data over a communications network. Data typically is communicated in a wired or wireless manner over digital communications networks such as the Internet, intranets, or the like (which may be represented in some figures simply as connecting lines and/or arrows representing data flow over such networks or more directly between two or more devices or modules) such as in digital format following standard communication and transfer protocols such as TCP/IP protocols.

Figure 1:
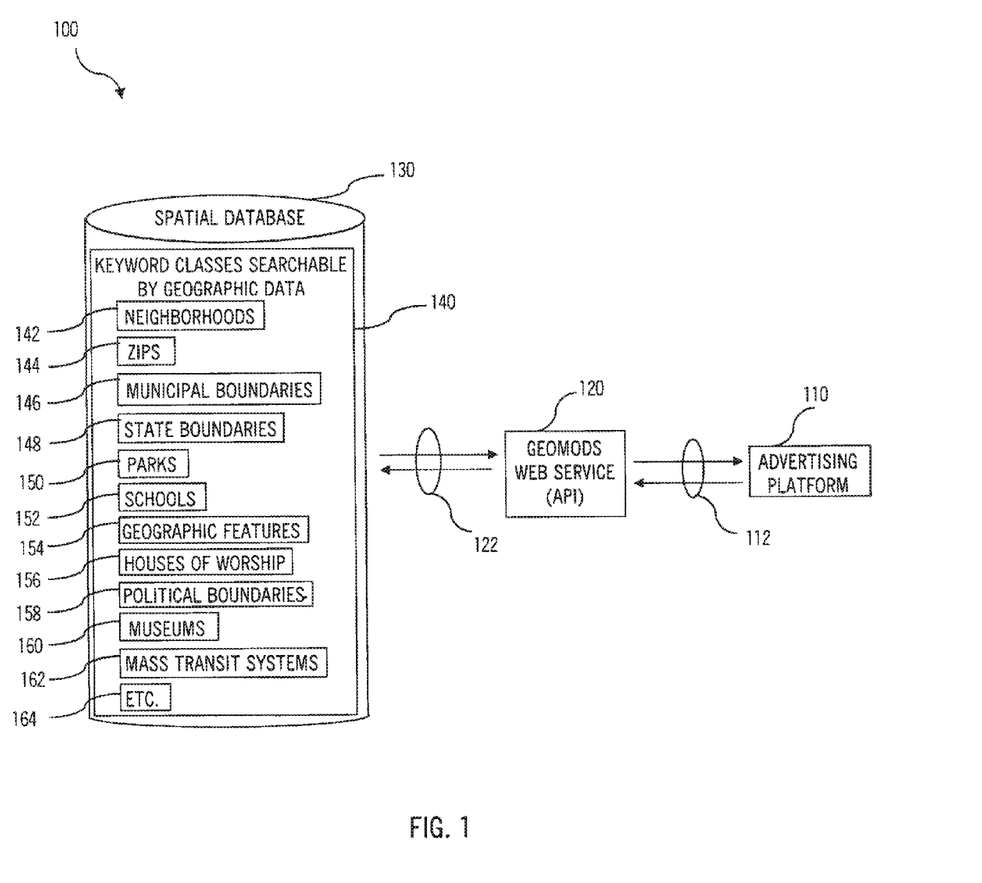
FIG. 1 is a block diagram of a computer system or network according to an embodiment of the invention showing a geomods (or geographical modifiers) web service or API generating sets of geographic keywords in response to queries from a client/user (e.g., an advertising platform or the like) for use in geotargeting or other geographical keyword searching.

The following description begins with a description of one useful embodiment of a computer system or network 100 with reference to FIG. 1 that can be used to implement the geo-keyword and geotargeting process in accordance with the invention. A more detailed system/network 200 is then described with reference to FIG. 2, and FIG. 3 illustrates examples of service areas that may be generated or defined for a single business based on user or requestor input to the geo-keyword generator engine or geomods web service. Then, representative processes are discussed in more detail with reference to the method 400 of FIG. 4 with support or more detail provided by the service area determination process 500 of FIG. 5.

Prior to turning to FIG. 1, it may be useful to explain that the inventors recognized that it is beneficial and desirable to anticipate or derive the intent of a searcher (or user of a search engine or searching tool on a website) based on the geographic search terms entered into a search or query input box, rather than offering a geotargeting method based on a user's IP address. While IP-based geotargeting can be effective at a national, state, and, sometimes at a, city level, it cannot provide the granularity required to support truly local ad targeting. To address this and other needs, the inventors developed a tool that incorporates user intent by selecting and providing relevant and actionable geographic modifiers to online advertisers of services to drive higher conversion rates for the online advertisers that use some or all of the modifiers in their websites and/or online advertising.

Local advertisers have not felt comfortable spending money for online campaigns because current geotargeting tools (primarily IP lookup, offered by Quova, MaxMind, Digital Envoy, Akamai and others) do not typically provide meaningful precision, with their accuracy determined only at the national, state, and, maybe, city/DMA. Anything more granular drastically decreases the confidence that can be offered by these IP-based tools, and the online advertisers waste their spend for clicks and other paid advertising budget outside the desired geographic service area. The inventors also recognize that it may be useful to allow users to define their own geographic service area or to define the service area based on business type and/or other parameters such as whether the business is in a rural or urban location (e.g., for a hardware store in an urban setting the service area might be defined by a 5 mile radius from the location of the store while for a car dealership the service area may extend 40 miles in all directions for the car lot location). One reason for the low precision in IP-based geotargeting has to do with ISPs using load balancers and proxy server. This hardware is very efficient at evenly distributing Internet traffic, but it has the unintended consequence of making packets appear that they came from somewhere other than where they really came from (e.g., one example of this is dial-up subscribers' IP address for a national company all being listed or determined as a single city regardless of actual location of the subscriber's computer/Internet access node).

FIG. 1 illustrates a geo-keyword generating system 100 for use in providing enhanced geotargeting of online advertising at a more geographically refined or local level. As shown, the system 100 includes an advertising platform or ad server 110 that may operate to support a search engine provider or the like to serve paid advertising targeted to Internet users based on their input search terms (rather than their location or IP address). In other cases, the advertising platform 110 may comprise a customer system that acts to assist local advertisers in performing SEO and paid advertising campaigns through use of geo-keywords provided in page content, metadata, and paid advertising search terms/phrases. The advertising platform 110 communicates as shown at 112 over a digital communications network such as the Internet with a GeoMods web service (e.g., an API) 120. Via these communications, the GeoMods web service 120 may receive a request for a set of geo-keywords and may return a set of geo-keywords to the advertising platform 110. The communications 112 may also provide information for defining a service area for one or more online advertisers (e.g., business owners or other service providers desiring to better target qualified local clients, customers, visitors, and so on). This information may include a business location, a business type, and other defining information such as maximum drive time for the customer or for workers of the business (e.g., pizza delivery, plumbers, and so on).

The GeoMods Web service 120 determines an appropriate service area and then via communications 122 queries a spatial database 130 to obtain a list of geo-keywords that define the service area with geographically based keywords or phrases (e.g., terms or phrases often used by individual online searchers to obtain information relevant to the geographic locality associated with or at least partially overlapping the geographic area of the determined service area). The web service 120 may be a programmatic application that automatically processes the input 112 and returns keywords or it may be fully or partially interactive (e.g., prompting a user/operator of platform 110 for input such as service area defining parameters). The keywords are returned via communications 122 to the GeoMods web service 120, which in turn sends this output as is (e.g., in plain text making it easy to integrate into campaign management platforms or the like) or in a report form (or to fill in a GUI at the platform 110 or the like) via communications 112 (e.g., communications per TCP/IP or other Internet protocol or via a wireless communications link between platform 110 and web service 120).

The spatial database 130 includes a number of keyword classes each containing numerous geo-keywords or geographically-based terms/phrases, and the keyword classes are searchable and/or indexed for searching using geographic data, such as a service area definition created by the GeoMods web service 120 based on data received from advertising platform 110. The keywords may also be returned according to or grouped into the classes 140 (e.g., a set of keywords from the parks class 150 may be returned for a business area), such as to facilitate a user/operator of platform 110 in determining which keywords to include in website content or in online advertising campaigns to attract qualified or relevant online traffic (e.g., a sporting goods store or a toy store may want to include keywords from the parks class 150 while an upscale clothing boutique may not so as to target their market). The classes 140 may include: neighborhoods 142, zip codes 144, municipal boundaries 146, state boundaries 148, parks 150, schools 152, geographic features 154, houses of worship 156, political boundaries 158, museums and other landmarks 160, mass transit systems/stations 162, and other classes useful for defining a locality 164 (e.g., airports, hospitals, cultural attractions, street names, post offices, and so on), and geo-keywords would be stored in or associated with each of these classes 140 in the database or data store 130.

The GeoMods web service 120 may be thought of as a 'synthetic geotargeting' tool that, in some embodiments, takes a business address and user-provider service area or web service 120-generated service area (e.g., a radius, a municipal boundary, an area restricted by ZIP, and/or a combination of these and/or other service area defining parameters), and the service 120 returns a series of geographic keywords (or geo-keywords, geomodifiers or GeoMods) that can be used as metadata to associate with the business listing for online content and/or paid advertising. For example, the returned geo-keywords can be used as additional keywords in a paid search, e.g., in or with Google's AdSense, Microsoft's AdCenter, Yahoo!'s Panama, and/or other paid search/contextual advertising platforms. The geo-keyword may be used in other portions of SEM or search marketing processes. The keywords may be provided in or as metadata that may be used to optimize organic listings on search engines, also known as SEO or search engine optimization.

The spatial database 130 typically contains a great amount of geographically-based data 140. The data or keywords (or service area defining terms/phrases) 140 may include terms or phrases regarding administrative boundaries, locations of parks, schools, churches, water bodies, postal codes, transit hubs, subway lines, bus stations, area codes, and the like. This spatial warehouse 130 may also contain a neighborhood database 142 such as built and/or created per the techniques and methods described in co-pending U.S. patent application Ser. No. 11/941,698, entitled "Geocoding Based on Neighborhoods and Other Uniquely Defined Informal Spaces or Geographic Regions," which is incorporated herein in its entirety by reference.

Figure 2A:
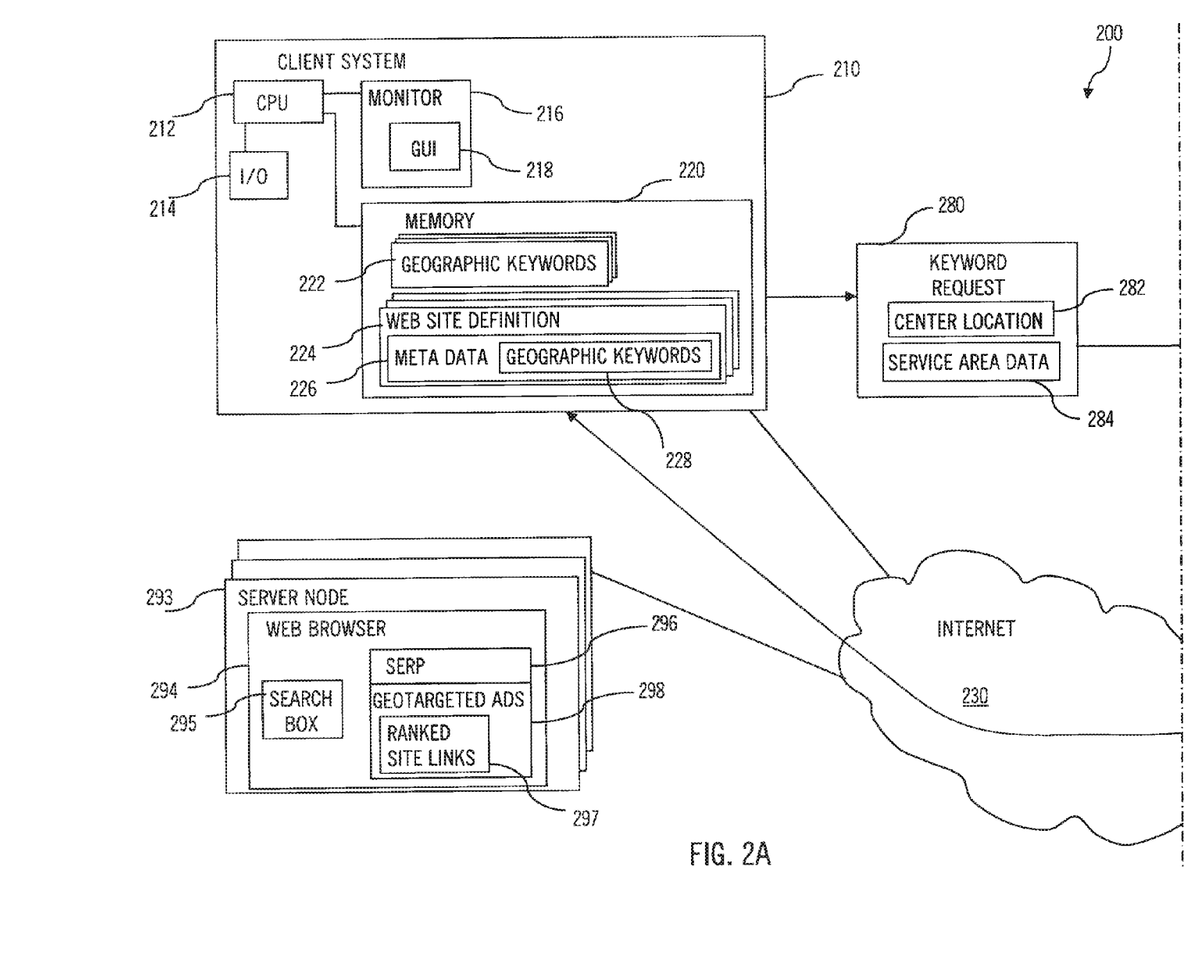
FIGS. 2A and 2B illustrate a functional block diagram of a geographical keyword generating and geo-keyword based targeted advertising system in accordance with an embodiment of the invention.
Figure 2B:
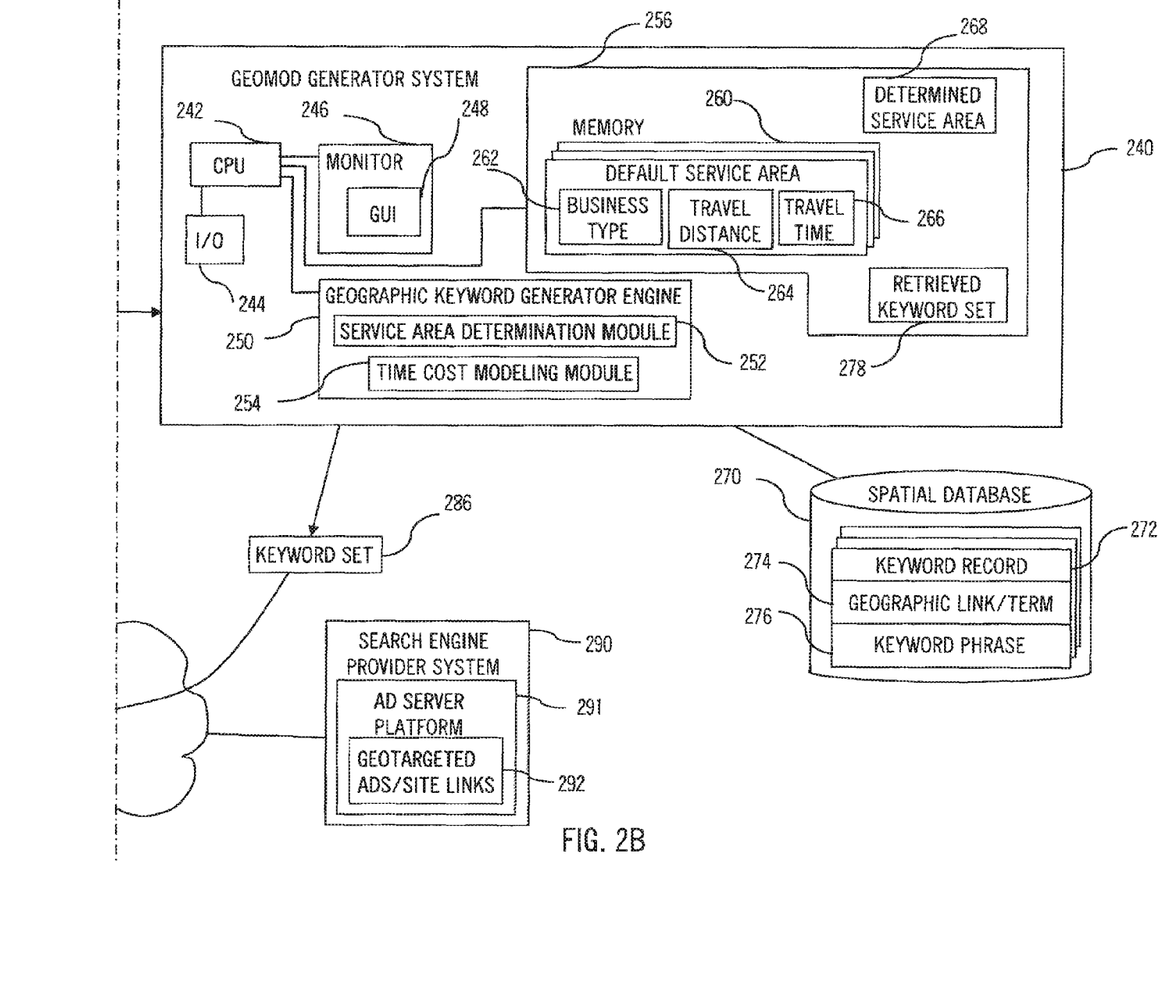
Figure 3:
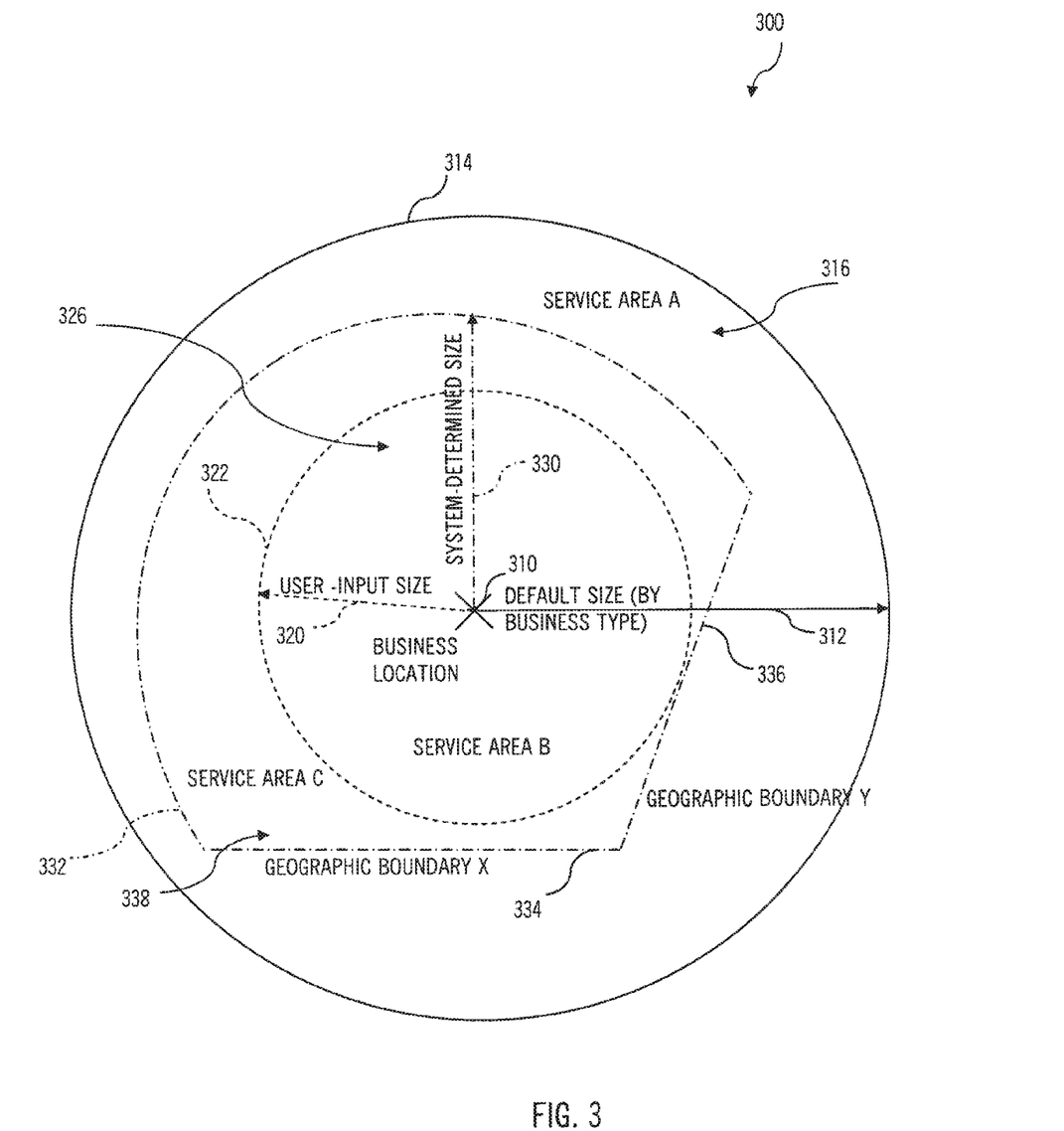
FIG. 3 illustrates schematically business service areas or geographic service areas as determined using a service area determination module with differing inputs and/or processes.

FIGS. 2A and 2B illustrate a simplified functional block diagram of an exemplary computer system or network 200 and its major components (e.g., computer hardware and software devices and memory devices) that can be used to implement an embodiment of the present invention. As shown, a client system or node 210 is communicatively linked with a geomod generator system 240, such as via a wired or wireless connection through the Internet or a direct communication link 230. The client system 210 may be an advertising platform (e.g., as shown in FIG. 1), a computer/node operated by a search engine or ad server, or a computer or network node operated by an individual online advertiser (such as a small business, an individual, or the like). The client system 210 may take a variety of forms of computer/electronic devices adapted for communicating with the geomod generator system 240 and, in this example, for performing some online targeted marketing activities such as creating a website definition/content or advertising campaign. The system 210 includes a CPU 212 that runs I/O devices 214 (such as keyboards, mice, touch pads/screens, and so on) that allow an operator/user to enter input/data such as to initiate a keyword request 280, to enter a business location/address 282, and/or service area definition data 284 (or other interactive input to facilitate a geo-keyword generation process performed by generator system 240).

The system 210 also may include a monitor 216 for displaying a GUI 218, which may show a keyword request screen created or served by generator system 240 and/or show results 286 of a geo-keyword generation process of the system 240. The system 210 further is shown to include memory 220 that stores geographic keywords 222 returned as set 286 from the generator system 240. In practice, these keywords 222 are typically used by an operator of the system 210 to modify or create one or more website definitions (e.g., to change content) so as to better direct relevant or qualified traffic to the website 224 such as by including metadata 226 with a set 228 of the returned/received geo-keywords 222. In other cases, the keywords 222 are used to improve online paid advertising results by providing these keywords 222 or a subset to a search engine provider 290 or an associated ad server platform 291 to obtain better presentation or more targeting to searchers interested in a locality including a service area (shown at 268) by more effectively serving of geo-targeted ads/website links 292.

To this end, the system 200 includes a plurality of searcher nodes 293 (e.g., user computer devices or electronic devices such as cell phones, PDAs, and the like) adapted for accessing the Internet 230 to search for information via a search engine served by search engine provider system 290. As shown, the searcher node 293 may provide a web browser 294 or other access device to a search engine provider 290. The browser or its GUI 294 includes a search box 295 or similar device/component to allow an operator of the searcher node 293 to enter search terms, and these terms are compared by the search engine provider 290 to perform a search and return a SERP 296 that includes an area with site links 297 based on a ranking of the page/site content (e.g., metadata 226 or the like). The SERP 296 also includes a set of geotargeted ads 298 that may include ads/site links 292, and these are chosen based on matches with the advertisers geographic keywords 222 and/or 228. In other words, the served ads 298 may be chosen based on how well the geo-keywords 222 and/or 228 match the user's search terms entered in the search box. In this manner, the served ads are based on the intent of the searcher as inferred by their search terms/search content rather than simply based on their IP address or their user profile.

The geomod generator system 240 is linked to the client system 210 such as via the Internet 230 or other digital data communications link, and the system 240 may be a server or other computer device/system to perform the keyword generator functions described herein. As shown, the system 214 includes a CPU 242 that runs or manages I/O devices 244, monitor 246 with GUI 248, and memory 256. The processor 242 also runs a geo-keyword generator engine 250 that operates to process a keyword request 280 from the client system 210 to return a geo-keyword set 286. The generator engine 250 may include a service area determination module 252 that retrieves a business or center location 282 for a business or service provider (or other online advertising entity) and service area data 284, and processes this information to create or determine a service area 268. In some cases, the service area 268 may be formed based on a default service area 260, which may be chosen based on the service area data 284 such as a business type 262, travel distance 264, travel time 266, and/or other parameters provided in data 284 and/or generated by module 252 (e.g., determining whether location is rural or urban). The default service area 260 may be a simple circular area with a particular radius or may be an area with a predefined boundary (e.g., a neighborhood boundary, a county boundary, or the like).

In other cases, though, the service area determination module 252 performs one or more algorithms to define the service area 268. For example, a time cost modeling module 254 may be utilized to model one or more areas to match a maximum travel time provided by the user in service area data 284, e.g., based on population density, road types, and other information for the geographical areas proximate or about the center location 282. These areas that can be reached within the allowed travel time may be combined to form the determined service area 268. FIG. 3 illustrates with mapping/diagram 300 a set of differing service areas 316, 326, 338 that may be defined for a single business (or center geographic location such as an address) with differing operations of the area determination module 252.

For example, a first service area 316 may be defined when a user provides a business location 310 along with a business type in the service area definition data 284 of the keyword request 280. The area 316 may be a default area retrieved using the business type with a preset shape/size, e.g., a radius 312 chosen for the business type such as a few blocks for a coffee shop, a few miles for a gas station, and many miles for a provider of expensive goods/services. Other shapes for the area 316 may be utilized with regular or irregular outer boundaries 314 (rather than a perimeter of circle as shown for illustrative purposes in FIG. 3). In another example, a second service area 326 may be generated about the center location 310 using a user-input or defined service area size 320 (e.g., a user may provide a travel distance that is assumed simply to be a radius). In other cases, the area 326 may be more irregular such as if the user provides a maximum drive time, which may be used to generate a number of service subareas (or polygons) in which the travel time (or time cost) is less than or averages to be less than the maximum travel time provided by the user (or by a system 240 administrator based on the business type). These service subareas or polygons may then be combined to form a larger service area 326 (or area 268 stored in memory 256). The irregular nature of the polygons or subareas arises from the fact that not all travel times are equal especially within an urban setting or an area with irregular terrain (e.g., a 10-minute drive may encompass a 10-mile distance in some directions from location 310 but much less in other directions due to irregular paths, speed limits, traffic congestion, and so on). In other cases, a service area 338 may be generated with the system or module 252 acting to create the size 330 (e.g., based on a user-input or system-selected maximum drive or travel time), but the boundary 332 may be further modified to account for other boundaries 334, 336 selected by the user or by the module 252, such as a state, city or similar boundary and/or a geographic boundary such as a mountain range, a river, or the like.

With the service area 268, the generator engine 250 acts to access one or more spatial databases 270 that store keyword records 272 and to search these keywords/records 272 with the service area data 268 such as by finding matching geographic links/terms 274 in the records 272 and then retrieving a list of the keywords or keyword phrases 276 (e.g., a name of a neighborhood, a name of a park, a name of landmark, and so on that are located within or associated with the defined service area or locality of the business/service provider associated with the central location 282). These keyword phrases are returned in a set 286 to the client system 210 for storage 222 and use to enhance its website rankings and/or geotargeted advertising.

Through the use of the systems 100 or 200, when a user, such as an advertising agency or an advertiser, uses the service 120 or system 240, a series of geographic keywords is returned that are germane to the service area defined for a business, service provider, or advertiser. Depending on the service area and the types of geographic terms desired or associated with the service area, there could be only a few keywords up to 100s or 1,000s of geo-keywords returned for a given business location and service area. Similar to how keywords are bid on in various interactive advertising platforms, geo-keywords will have increased value over time. This is partially because all or portions of the keywords in the spatial databases (such as a database of neighborhoods) may be licensed or otherwise provided to major web portals, which will in turn drive greater consumer awareness and acceptance of these geographic search terms. The geomod generator system 240 and web service 120 may be used to determine if a business' service area falls within a given neighborhood or is associated with other spatial keywords and, when appropriate, make the keyword(s) available to them. The generators 120, 240 may include (such as via licensing or otherwise obtaining permission) geographic entities or keyword phrases/records from third parties (e.g., point of interest (POI) data may be licensed from NAVTEQ and others). The spatial data and keywords may be altered over time to practice the invention, e.g., new thematic layers may be collected, keyword phrases may be sourced from other parties, and the like and used to update the spatial databases 130, 270. Hence, it may be useful to repeat the keyword requests 112, 280 to obtain updated keyword result sets 122, 286 and perform additional SEO optimization and geotargeting processes.

The geomods generator service/engine may be used programmatically (via writing code) or interactively (via web browser). The service, in some embodiments, uses a REST protocol, and request types can be defined by entity (e.g., geographic) type and service area can be defined by a point (long/lat) and radius, bounding box (long/lat pair), ZIP centroid, and restricted in many varied ways. Such additional (system-implemented and/or user-defined) restriction(s) is useful for many service providers that may not provide their services to customers within a simple circular area. For example, an insurance office located in Trenton, NJ wants to define its service area as 60 miles, but an insurance company/office may be legally restricted from marketing insurance products in Pennsylvania (adjoining states/countries). In this case, the generator service/engine may process the query to determine a base service area and then apply restrictions to further define with additional boundaries (e.g., to exclude areas), e.g., could structure the service area so as to return all geographic entities within a 60 mile radius but restricted to the state of New Jersey. Processes and systems in accordance with the invention seek to address the intent of a user, rather than where she is located. This is achieved, in part, by returning geographic entities (or geo-keywords) within a given area or associated with a given service area. The results can be used in interactive advertising and search optimization (SEO) programs.

To enhance and automate the selection of the geographic keywords, it is useful to associate a given business category with a service area. Business categories, in some embodiments, are organized under several taxonomies. For example, yellow pages-type classification of business types is one commonly-used format and the US Bureau of the Census' NAICS (North American Industry Classification System), which is a hierarchical index of industries, may also be used. It is the successor to SIC (Standard Industrial Classification) codes. When an industry keyword (e.g., plumber) is provided as the business type, the geomods system/engine relates that to a suggested service area (e.g., a default area and/or size and/or drive time or distance). Similarly, if a NAICS or SIC code is entered, the geomods system/engine will return a suggested service area for this business type.

In this manner, the processes of the invention recognize that different business types will have different service areas, e.g., a car dealership will have a broader service area than, for example, a grocery store. It also may be that, for example, a coffee shop (e.g., a particular business or service provider) may have a broader service area in a suburban/outlying/rural area than a coffee shop in an urban environment. Similarly, an automotive dealership will have a broader service territory than a dry cleaner. Factors and/or defining parameters that influence a service area size and shape may include: competing businesses within the same geographic region; accessibility to parking and/or mass transit; willingness of customers/service providers to commute (by foot, bicycle, automobile, mass transit or other modes) a given amount of time; natural landforms (e.g., mountains, non-navigable bodies of water, and so on); and other factors. These inputs are typically not specific to an individual business or proprietary. Other inputs, such as demographics, retail sales, and so on may be specific to an individual business and/or store location (e.g., have to be user provided in many cases) and be of value for the purposes of planning new facilities ("site planning") as well as targeted advertising based on geography/service area.

According to some aspects, the invention seeks to dynamically represent a business service area based on non-proprietary factors such as those stored in spatial databases as discussed above. Service area determination may be based on a user-provided maximum travel time, and the service area may be derived as being the polygon area(s) delineating any location reachable within that amount of time specified. For plumbers and other service providers that go to their customer's locations, the service area is their travel range while for a grocery store or other stationary/anchored service providers, the service area identifies where potential customers may be coming from to obtain their goods and/or services.

Service area determination in some cases relies on two parameters: the maximum travel time and the time cost associated with traversing a segment of the street network from origin outward. Maximum travel time is in reality localized or specific to the consumer (e.g., a rural resident will travel 60 minutes to a movie theatre for lack of any other options while an urbanite will travel 30 minutes or less, for example). For a simplifying assumption, the maximum travel time typically is localized to the origin or business center/location. Time duration is a summation of a function per segment of a shortest path. This may be modeled by involving or considering population density, road types, and intersection types local to the road topological network connecting to the business location. A service provider or customer slows down on a freeway less in dense areas than on arterials in dense areas for example. The parameters are manually tuned and are based on a "that-looks-about-right" estimation of the results in some cases where an operator tunes the parameters to provide enhanced modeling of service areas. The resulting output may be a polygon (or, more accurately, a series of polygons, each representing regions within the actual service area and their approximate travel time). Following from this, certain classes of terms may be more or less relevant to the approximate travel time, e.g., civic institutions and neighborhoods are relevant at the hyper local level and city names, counties, and states are more relevant as distance increases. The polygonal service area(s) can then be used to extract the relevant geographically-modified keywords or geomods, as discussed previously.

Figure 4:
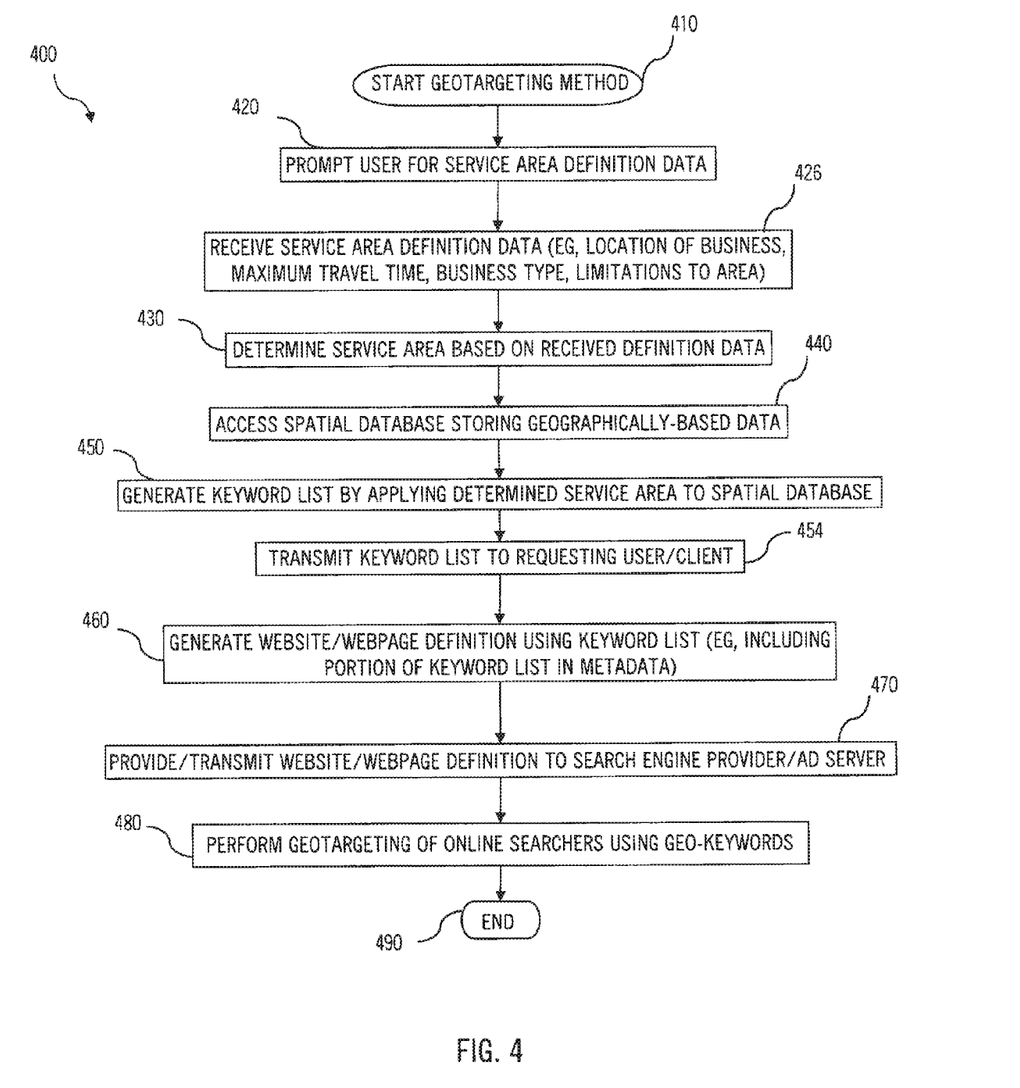
FIG. 4 is a flow diagram illustrating an embodiment of a geotargeting method of an embodiment of the invention such as may be achieved during operation of the system of FIG. 1, including generation of a keyword list by querying a spatial database with a service area definition.

FIG. 4 illustrates a geotargeting method 400 that may be performed in accordance with the invention, such as by operation of the systems 100 or 200 (e.g., with system 200, steps 410-454 may be performed with geomod generator system 240 while steps 460 and 470 may be performed with client system 210 and/or search engine provider system 290 and step 480 with search engine provider system 290/ad server 291). The method 400 starts at 410, such as by creating and populating a spatial database with geo-keywords, loading a geo-keyword generator engine/service on a server or computer linked to a communications network, and making the engine/service available to client systems such as advertiser platforms over the network (or directly, in some cases). At 420, the method continues with prompting a user for a set of service area definition data, including a center location for a service area (e.g., a business address), via a GUI or the like. At 426, the service area definition data is received at the keyword generator engine/service in a keyword request. The data may include a center location/address along with area defining data such as maximum travel time/distance, business type, and other limiters such as only advertise within a particular state, city, county, or the like.

At 430, the method 400 includes determining, with the generator engine/service, a service area for geotargeting of searchers or online users of a search engine/website based upon the received service area definition data. At 440, the spatial database is accessed by the generator engine/service, and at 450, a geo-keyword set or list is generated by applying the determined service area to the spatial database. At 454, the keyword list is transmitted from the generator engine/service to the requesting user or client device (e.g., for display in their GUI and/or storage in the client memory or memory accessible by the client device). At 460, the client system may use the set of geo-keywords or geomods to generate or modify a website definition, e.g., by including some or all of the keywords or keyword phrases in site content or in metadata, and/or to enhance paid advertising results by providing the geo-keywords to an ad server or search engine provider for use in geotargeting online ads within returned SERPs. At 470, the website or advertising search terms are provided to the search engine or are published for inclusion in search engine databases, and, at 480, geotargeting may be performed by the search engine/ad server by comparing search terms provided by online users of the search engine (or searchers) with the geo-keywords to, at least in part, determine which advertisers ads and/or website links to include in SERPs returned to the searchers. At 490, the method 400 is ended.

Figure 5:
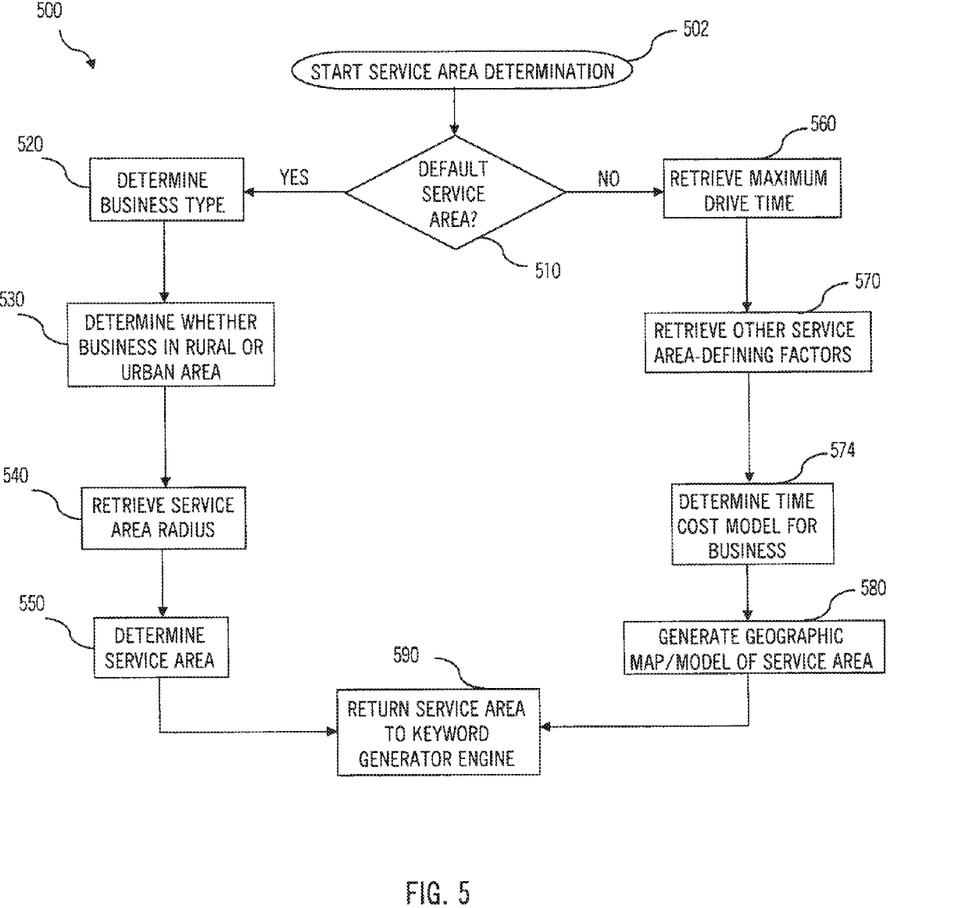
FIG. 5 is a flow diagram illustrating an embodiment of a method of determining a geographic service area as may be utilized in the method of FIG. 4 and/or operation of the systems of FIGS. 1 and,/or 2.

FIG. 5 illustrates one implementation of the service area determination 430 as may be carried out by the web service 120 of FIG. 1 and/or service area determination module 252 of FIG. 2. At 502, the method 500 starts, such as by storing in memory a plurality of default service area definitions and/or defining terms (e.g., service area size for a particular business type and so on) and by generating a user interface for prompting a user to provide area defining parameters (e.g., maximum drive or travel time, restrictions to service, business type/description, and the like). At 510, the method 500 continues with determining whether the keyword request has indicated that the user is requesting use of a default service area. If yes, the method 500 continues at 520 with a determination of the user-provided (or system determined) business type (e.g., coffee shop, clothing store, gas station, hotel, and so on). At 530, a determination may be made as to whether the business location falls within an urban, suburban, rural, or other area that may affect speed of travel. At 540, a service area radius may be retrieved or determined using the business type and the type of locality in which the business is located. At 550, the generator engine/service may determine the service area by extending the retrieved radius from the center location or business address/location to create a circular perimeter defining an outer boundary of the service area. In some embodiments, further processing may be performed such as to apply service area restrictions provided by the user or automatically applied by the generator engine/service. At 590, the service area is returned for use in accessing/searching a spatial database for a set of geo-keywords corresponding to the determined service area.

At 510, when the user has requested a non-default service area, the method 500 continues at 560 with retrieving a maximum drive time from the service area data provided by the client or requester. At 570, the method 500 may include retrieving other service area-defining factors or restrictions (e.g., within a particular state, on one side of a geographic feature such as a river or mountain range on one side of a street (i.e., the street provides a boundary of the service area in one direction for example), and/or the like). At 574, the method 500 includes determining the time cost model for the business or service provider, such as with the time cost modeling module 254 shown in FIG. 2. At 580, the generator engine/service acts to generate a geographic mapping or model of the service area about the center location or business address, and this may involve identifying a plurality of polygons that fit the maximum drive time/time cost model and/or restrictions and then combining these polygons or service subareas to create a service area (typically with an irregular outer perimeter or boundary). Then, at 590, the service area is returned to the generator engine/service for use in accessing or searching the spatial database for a set of corresponding geo-keywords.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. For example, the geotargeting methods described herein may readily be applied to mobile, Internet consumers (e.g., to provide geographic and/or demographic targeting). In the field of online advertising, industry analysts regularly speak of massive growth in online advertising. With an estimated 15 million small businesses in the United States alone, the opportunity to migrate this ad spend online represents a significant opportunity. However, small and medium-sized businesses (SMBs) are reluctant to use all-digital advertising as the benefits are not yet well-proven. In the offline world, direct marketing has been viewed as a much larger cousin of local search. Direct marketing programs tend to be offered by database marketers who have compiled significant amounts of demographic and behavioral data about consumers. This is often based on data from the U.S. Census, and then augmented with a variety of third party databases. Typically, a customer of a direct marketing firm would articulate or define their target consumer, such as by age, spending habits, location, and the like, and the vendor will provide a list of names, addresses and telephone numbers for those who meet the required variables. While this solution is far from perfect, it is one efficient means of targeting specific groups of consumers.

Interactive marketing has evolved differently, such that users are targeted based on IP address. With the advent of mobile advertising, marketers and others have the ability to know a user's location with greater specificity. This may be done through several location finding techniques. The common means of determining location of a mobile user include triangulation based on proximity to a wireless Internet access point (known as WiFi triangulation, popularized by Skyhook Wireless and others), triangulation/proximity to cell towers, whereby a database of cell tower locations is resolved to a lng/lat and GPS, through which location is determined buy triangulation of three or more orbiting satellites. However, the user still may be using the Internet to search outside their current location, and the geotargeting methods described herein may be applied to these mobile online searchers or Internet users.

Further, in the context of mobile marketing and geotargeting, many marketers are not experienced with the specific methods of advertising to mobile devices. The cost to market to them in a fundamentally different way has caused great marketer (and, therefore, advertiser) reluctance. This invention may be used to effectively merge offline and online prospects, giving a marketer a portfolio view of customers. For example, by overlaying a user's location onto a spatial database of demographic data, marketers can associate individual lng/lat with demographic data (e.g., the intent-based geotargeting may, in some embodiments, be combined with or used concurrently with mobile user-location based geotargeting). This in turn gives the advertiser the opportunity to target that location via offline or online media.

From the above, it can be seen the computer-based methods and functions provide enhanced geotargeting of online advertising. In some embodiments of the methods, keywords are stored in the database so as to be spatially indexed by the locations or regions they represent (e.g., region-of-reference). Each request to the geomods API may generate a spatial service area by naming a region, a geocoding address, a drive time, and the like. The list of keywords returned for a request is, in some cases, composed of those terms whose region-of reference spatially overlaps with the defined service area. In other words, the spatial database is doing geometry with a number of latitude and longitude values (or other spatial defining information) to find relevant keywords. This is one key distinction for the methods described herein relative to a keyword expansion service (e.g., a thesaurus-based service or the like). In some cases, a client/user of the geomods service may specify which types of keywords the service should return in the geo-keyword set and/or may make such a decision/specification based on NAICS code, for example. Related to these functions/features, keywords may also be indexed by their type/category. Additional data may be used to enhance the returned keywords, and additional data may be used to initially select the keyword set.

Further, meta information, such as population, cost-per-click (CPC), social characteristics, and the like, may be associated with the keywords and returned to the requester in the geo-eyword set for their use in geotargeting or for other uses. The provision of CPC information is important in some applications because all keywords have different bid prices, based on actual demand for those terms. The CPC meta information for each keyword may be used to tell the current (average) price of the keyword in question, which is useful to help determine the relative merits of buying a specific keyword (e.g., if Manhattan costs $3 per click and NYC costs $1 per click, the latter may yield enough clicks (and therefore leads) to be worthwhile). Similarly, keyword volume reveals the relative uniqueness of the term (e.g., how many users are searching on a search engine using that term).

The methods described above provide a number of unique functions and/or advantages. The methods include service area generation/determination. This determination of a proper service area may use a variety of variables such as location, business category, business size, geography, demographics, drive times, and more. Another unique aspect is the generation/mapping of keywords and keyword groups from spatially-indexed databases to service area (e.g., based on business type and size, geography, and demographics). Further, advertising platforms and search engines are enhanced and/or their operations are enhanced (e.g., improved geotargeting of online ads and the like) through the use of the service area generation and keyword/keyword groups mapping to service areas.

We claim:

1. A computer-based method for use in geotargeting online advertisements to users of search engines, comprising:
   providing a geographic keyword generator running on a computer communicatively linked to a digital communications network;
   providing a spatial database in data storage comprising a plurality of geographic keywords;
   from a client node linked to the communications network, receiving a keyword request including location data for an advertiser;
   operating the geographic keyword generator to generate a service area based on the location data, wherein the service area defines boundaries of a geographic area;
   with the geographic keyword generator, retrieving a set of the geographic keywords from the spatial database associated with the service area; and
   reporting the set of geographic keywords to the client node for use in the geotargeting of the online advertisements.

2. The method of claim 1, wherein the keyword request further includes a business type and the generating of the service area comprises selecting a size of the generated service area based on the business type.

3. The method of claim 1, wherein the generating of the service area further comprises determining whether the location data corresponds to a urban or non-urban locality and the size of the generated service area is smaller for urban localities than for non-urban localities.

4. The method of claim 1, wherein the keyword request further comprises a maximum travel time and the generating of the service area comprises selecting a size of the generated service area based on the maximum travel time.

5. The method of claim 4, wherein the generating of the service area comprises using the maximum travel time to generate a plurality of polygonal areas about a center location chosen based on the location data modeling travel relative to the center location in differing directions and wherein the generated service area comprises a combination of the polygonal areas.

6. The method of claim 1, wherein the location data comprises a location of a service provider and wherein the generating of the service area comprises selecting a service area radius and generating an outer boundary using the service area radius extending outward in all directions from the service provider location.

7. The method of claim 6, wherein the keyword request comprises further area restrictions and wherein the generating of the service area further comprises applying the further area restrictions to modify the outer boundary.

8. The method of claim 1, wherein the, geographic keywords in the spatial database are searchable using geographic data corresponding to the generated service area.

9. The method of claim 8, wherein the geographic keywords are associated with classes of spatial data including at least one of: neighborhoods, area codes, parks; rail systems, postal codes, landmarks, hospitals, mass transit systems, administrative boundaries, museums, airports, schools, governmental boundaries, geographic features, bus stations, train stations, cultural attractions, and post offices.

10. The method of claim 1, further comprising with the client node modifying a website definition or advertising search term set to include at least a subset of the set of geographic keywords.

11. A method for targeting a website toward online searchers based on geographical information submitted to a search engine in an online search, comprising:
   receiving a keyword request with a keyword generator run by a processor of a computer, the keyword request including a geographic location associated with a service provider and a business type associated with the service provider;
   operating the keyword generator to determine a geographically defined service area for the service provider using the geographic location as a center point and using the business type to define a size of the service area;
   querying a spatial database using the service area to identify a set of geographic keyword phrases for the service area;
   transmitting the set of geographic keyword phrases to a client node; and
   providing a website on the Internet that has content including at least a portion of the set of geographic keyword phrases.

12. The method of claim 11, wherein the set of geographic keyword phrases are associated with classes of spatial data including at least one of:

neighborhoods, area codes, parks; rail systems, postal codes, landmarks, hospitals, mass transit systems, administrative boundaries, museums, airports, schools, governmental boundaries, geographic features, bus stations, train stations, cultural attractions, and post offices.

13. The method of claim 12, wherein the keyword generator includes data defining a maximum travel time and wherein the service area is defined by applying the maximum travel time to the center point.

14. The method of claim 11, further comprising defining an online advertisement search term provided to a search engine provider to include one of more of the geographic keyword phrases.

15. A non-transitory computer readable medium for generating sets of geographic modifiers for use in geotargeting via a search engine, comprising:

computer readable program code devices configured to cause a computer to effect generating a definition of a geographic service area for a business;

computer readable program code devices configured to cause the computer to effect searching a spatial database comprising geo-keywords using the geographic service area to retrieve a set of geo-keywords associated the geographic service area; and computer readable program code devices configured to cause the computer to effect reporting the set of geo-keywords to a client node.

16. The non-transitory computer readable medium of claim 15, further comprising computer readable program code devices configured to cause a computer to effect receiving a keyword request including a business address and wherein the generating of the definition of the geographic service area comprises associating a central point of the geographic service area with a geographical location corresponding with the business address.

17. The non-transitory computer readable medium of claim 16, further comprising computer readable program code devices configured to cause a computer to effect receiving a business type and wherein the generating of the definition of the geographic service area comprises sizing the geographic service area based on the business type.

18. The non-transitory computer readable medium of claim 16, further comprising computer readable program code devices configured to cause a computer to effect receiving a maximum travel time and wherein the generating of the definition of the geographic service area comprises sizing the geographic service area based on the maximum travel time.

19. The non-transitory computer readable medium of claim 15, wherein the geo-keywords stored in the spatial database are associated with classes of spatial data including at least one of: neighborhoods, area codes, parks; rail systems, postal codes, landmarks, hospitals, mass transit systems, administrative boundaries, museums, airports, schools, governmental boundaries, geographic features, bus stations, train stations, cultural attractions, and post offices.

20. The non-transitory computer readable medium of claim 19, the set of geo-keywords comprises two or more keyword phrases from two or more of the classes of spatial data.

* * * * *